US008497359B2

(12) United States Patent
Fenn et al.

(10) Patent No.: US 8,497,359 B2
(45) Date of Patent: Jul. 30, 2013

(54) CATIONIC ELECTRODEPOSITABLE COATING COMPOSITION COMPRISING LIGNIN

(75) Inventors: David Fenn, Allison Park, PA (US); Mark P. Bowman, New Kensington, PA (US); Steven R. Zawacky, Pittsburgh, PA (US); Ellor J. Van Buskirk, Pittsburgh, PA (US); Peter Kamarchik, Saxonburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 117 days.

(21) Appl. No.: 12/714,141

(22) Filed: Feb. 26, 2010

(65) Prior Publication Data

US 2011/0213057 A1    Sep. 1, 2011

(51) Int. Cl.
C07G 1/00      (2011.01)
C08H 7/00      (2011.01)
C08L 97/00     (2006.01)
C09D 197/00    (2006.01)
C09J 197/00    (2006.01)

(52) U.S. Cl.
USPC .............. 530/501; 530/505; 106/123.11

(58) Field of Classification Search
USPC ..................................... 524/612
See application file for complete search history.

(56) References Cited

U.S. PATENT DOCUMENTS

| | | | |
|---|---|---|---|
| 2,709,696 A | 5/1955 | Wiest et al. | |
| 2,863,780 A | 12/1958 | Ball, Jr. | |
| 3,407,188 A * | 10/1968 | Cavagna | 530/501 |
| 3,476,795 A * | 11/1969 | Allan | 560/68 |
| 3,483,184 A * | 12/1969 | Chamberlain | 536/30 |
| 3,538,071 A * | 11/1970 | Kim | 530/505 |
| 3,546,199 A * | 12/1970 | Look et al. | 530/500 |
| 3,718,639 A * | 2/1973 | Falkehag et al. | 530/505 |
| 3,865,803 A * | 2/1975 | Falkehag | 527/400 |
| 4,017,419 A * | 4/1977 | Ludwig et al. | 516/43 |
| 4,017,475 A * | 4/1977 | Ludwig | 527/403 |
| 4,236,579 A * | 12/1980 | Kalfoglou | 166/270.1 |
| 4,265,809 A * | 5/1981 | Holsopple et al. | 530/501 |
| 4,455,257 A | 6/1984 | Hoftiezer et al. | |
| 4,721,778 A * | 1/1988 | Dilling | 530/501 |
| 4,732,572 A * | 3/1988 | Dilling | 8/557 |
| 4,764,597 A * | 8/1988 | Dilling | 530/501 |
| 4,775,744 A | 10/1988 | Schilling et al. | |
| 4,918,167 A * | 4/1990 | Glasser et al. | 530/502 |
| 5,071,517 A | 12/1991 | Oabayashi | |
| 5,116,912 A * | 5/1992 | Lindert et al. | 525/340 |
| 5,188,665 A * | 2/1993 | Schilling | 106/31.69 |
| 5,202,403 A * | 4/1993 | Doering | 527/403 |
| 5,226,976 A | 7/1993 | Carlson et al. | |
| 5,236,571 A | 8/1993 | Blechta et al. | |
| 5,262,042 A | 11/1993 | Okabayashi | |
| 5,328,505 A * | 7/1994 | Schilling | 106/277 |
| 5,421,989 A | 6/1995 | Stamp et al. | |
| 5,543,182 A | 8/1996 | Joshi et al. | |
| 5,647,956 A * | 7/1997 | Elliott et al. | 162/163 |
| 5,656,148 A | 8/1997 | Martyak et al. | |
| 5,672,181 A | 9/1997 | Warlimont et al. | |
| 5,788,822 A | 8/1998 | Martyak et al. | |
| 5,837,119 A | 11/1998 | Kang et al. | |
| 5,980,715 A * | 11/1999 | Eckert et al. | 204/501 |
| 5,989,299 A * | 11/1999 | Dilling et al. | 8/554 |
| 6,059,952 A | 5/2000 | Kang et al. | |
| 6,077,888 A * | 6/2000 | Schilling | 524/76 |
| 6,322,685 B1 | 11/2001 | Kang et al. | |
| 7,323,501 B2 | 1/2008 | Funaoka | |
| 2003/0139319 A1* | 7/2003 | Scheibel | 510/462 |
| 2003/0141195 A1 | 7/2003 | Brodt et al. | |
| 2003/0150524 A1 | 8/2003 | Wichelhaus et al. | |
| 2004/0063033 A1 | 4/2004 | Hotta | |
| 2004/0134794 A1 | 7/2004 | Sundaram et al. | |
| 2004/0168925 A1 | 9/2004 | Landau | |
| 2004/0222085 A1 | 11/2004 | Mohanta et al. | |
| 2005/0072683 A1 | 4/2005 | Nakada et al. | |
| 2005/0136330 A1 | 6/2005 | Mao et al. | |
| 2007/0170067 A1 | 7/2007 | Kubota et al. | |
| 2011/0094678 A1* | 4/2011 | Blount | 156/336 |
| 2011/0098384 A1* | 4/2011 | Blount | 524/35 |

FOREIGN PATENT DOCUMENTS

| | | |
|---|---|---|
| EP | 268075 B1 | 9/1991 |
| EP | 0319017 B1 | 4/1994 |
| EP | 0319018 B1 | 4/1994 |
| EP | 0319016 B1 | 6/1994 |
| EP | 633329 A1 | 1/1995 |
| EP | 786539 A2 | 7/1997 |
| EP | 1564264 A1 * | 8/2005 |
| JP | 8001858 A | 1/1996 |
| JP | 8025553 A | 1/1996 |
| JP | 8049084 A | 2/1996 |
| WO | 0024499 | 5/2000 |

OTHER PUBLICATIONS

Stewart, Industrial Crops and Products 27 (2008) 202-207.*

* cited by examiner

*Primary Examiner* — Liam Heincer
(74) *Attorney, Agent, or Firm* — Diane R. Meyers

(57) ABSTRACT

A cationic electrodepositable coating composition is disclosed. The present invention in directed to a cationic electrodepositable coating composition comprising a lignin-containing cationic salt resin, that comprises (A) the reaction product of: lignin, an amine, and a carbonyl compound; (B) the reaction product of lignin, epichlorohydrin, and an amine; or (C) combinations thereof.

16 Claims, No Drawings

CATIONIC ELECTRODEPOSITABLE COATING COMPOSITION COMPRISING LIGNIN

The United States Government may have certain rights to this invention pursuant to Contract No. DE-FC36-05G085004 awarded by the Department of Energy.

BACKGROUND OF THE INVENTION

1. Field of the Invention

The present invention relates generally to a cationic electrodepositable coating comprising lignin.

2. Background Information

Prices of raw materials used in many manufacturing processes continue to rise, particularly those whose price is tied to the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a cationic electrodepositable coating composition comprising a lignin-containing cationic salt resin.

The present invention is also directed to a cationic electrodepositable coating composition comprising a lignin that has been reacted with a monofunctional compound.

The present invention is also directed to a cationic electrodepositable coating composition comprising lignin wherein the lignin has not been reacted with a monofunctional compound and wherein the lignin comprises ≧5 weight percent of the coating composition based on the total resin solids of the coating composition.

The present invention is also directed to a method of making a cationic electrodepositable coating composition comprising: (i) reacting lignin, a carbonyl compound, and an amine; and (ii) reacting the reaction product of (i) with an acid.

The present invention is also directed to yet another method of making a cationic electrodepositable coating composition comprising: (i) reacting lignin and epichlorohydrin to form an intermediate reaction product, and then reacting the intermediate reaction product with an amine; and (ii) reacting the reaction product of (i) with an amine and an acid.

The present invention is also directed to another method of making a cationic electrodepositable comprising: reacting lignin and a monofunctional compound to form a reaction product; and adding the reaction product to a cationic film-forming resin.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "a" monofunctional compound, "an" amine, "a" lignin; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components.

Electrodepostiable Coating Composition

As stated above, the present invention relates to an electrodepositable coating composition (electrodeposition or e-coat) that comprises lignin. Lignin is a racemic macromolecule derived primarily from plants and trees. In general, lignin typically has a molecular weight that exceeds 10,000 Daltons. Although the chemical composition of the lignin can vary depending upon its source and the method by which it is extracted, lignin generally comprises a group of phenolic polymers, which comprise a number of hydroxyl functional groups as well as aromatic rings. In addition to the phenolic polymers, the lignin may also comprise carboxylic acid functional groups as well as methylene moieties. While various methods of extracting lignin are known in the art (see U.S. Pat. No. 7,323,501, col. 7, line 12, to col. 8, line 31, and col. 10, line 15, to col. 24, line 26, the cited portions being incorporated herein by reference) lignin is commercially available from a variety of sources such as Ligno Tech USA (Rothchild, Wis.), Tembec (Montréal, QC), Fraser Paper (Toronto, ON), MeadWestvaco (Richmond, Va.) and KMT Lignin Chemicals (St. Albans, Hertfordshire).

As used herein, "lignin" refers to any lignin or lignin derivative which include Brauns' lignin, cellulolytic enzyme lignin, dioxane acidolysis lignin, milled wood lignin, Klason lignin, periodate lignin, kraft lignin, lignosulfates, organosolve lignin and steam explosion lignin or any substances made in whole or in part from lignin or any subunits, monomers, or other components derived therefrom. Thus, lignin is meant to include lignin, and/or any compound comprising lignin or the residue thereof.

The lignin disclosed herein forms a portion of an electrodepositable coating composition that can be deposited onto a substrate and cured to form a coating layer. While the lignin may be reacted and/or polymerized with other components (e.g., an epoxy functional resin, a monofunctional compound) to form a part of the electrodepositable coating composition, it may also be added to the electrodepositable coating composition without being reacted and/or polymerized with such components.

I: Reaction Product of Lignin and Monofunctional Compound

The present invention is directed to an electrodepositable coating composition comprising a lignin that has been reacted with a monofunctional compound. The reaction product of the lignin and the monofunctional compound is sometimes referred to herein as a modified lignin or a lignin derivative.

The modified lignin will have reduced reactivity towards other components that may be used in the formation of the electrodepositable coating composition. For example, the modified lignin could have reduced reactivity toward epoxy groups found on other materials (e.g., epoxy functional monomers) used to form a portion of the electrodepositable coating composition. One potential advantage of the modified lignin's reduced reactivity is that likelihood of gellation of the coating composition during synthesis of the coating composition, such as during resin synthesis, can be reduced and/or eliminated. A variety of monofunctional compounds may be used to react with the lignin. For example, a monofunctional alcohol (e.g., CELLOSOLVE or butyl CARBITOL) can be used to react with at least a portion of the carboxylic acid functional group and/or active methylene moiety on the lignin thereby rendering them substantially unreactive. In other embodiments, a monofunctional compound, such as a monofunctional cyclic carbonate (e.g., ethylene carbonate, propylene carbonate, butylene carbonate), can be used to react with at least a portion of the hydroxyl and/or carboxylic acid functional groups of the phenolic portion of the lignin thereby rendering those groups and/or moieties unreactive. Other monofunctional compounds that may be used to modify the lignin include, without limitation, simple monofunctional epoxides (e.g., ethylene oxide, propylene oxide, butylene oxide), monofunctional glycidyl ethers and esters (e.g., phenyl glycidyl ether, t-butylphenyl glycidyl ether, 3-ethylhexyl glycidyl ether, neodecanoic acid glycidyl ester), or combinations thereof.

The modified lignin described in the preceding paragraph can be prepared by reacting the lignin with the monofunctional compound neat or in the presence of an organic solvent. Suitable solvents that may be used include, without limitation, ketone (e.g., methyl isobutyl ketone, methyl amyl ketone), aromatics (e.g., toluene, xylene), glycol ethers (e.g., dimethyl ether of diethylene glycol), or combinations thereof. In certain embodiments, the reaction is conducted at a temperature ranging from 80° C. to 160° C. for 30 to 360 minutes using typical catalysts such as sodium hydroxide or ethyltriphenyl phosphonium iodide until all the monofunctional material is consumed or all the functional groups and/or moieties of the lignin that are reactive toward the monofunctional material are consumed. In certain embodiments, however, it may be desired to have some remaining monofunctional material and/or functional groups and/or moieties on the lignin that can be reacted that are reactive toward the monofunctional material. In certain embodiments, the equivalent ratio of reactants (i.e., monofunctional epoxy groups and/or monofunctional cyclic carbonate groups: phenolic hydroxyl groups on the lignin) is typically from 1.00:0.50 to 0.50:1.00.

In certain embodiments, the modified lignin comprises 10 weight percent to 40 weight percent, such as from 20 weight percent to 30 weight percent, of the electrodepositable coating composition based on total resin solids of the coating composition.

II: Lignin-Containing Cationic Salt Resin

The present invention is also directed to an electrodepositable coating composition comprising a lignin-containing cationic salt resin. As used herein, "lignin-containing cationic salt resin" means a positively charged resin or polymer molecule that comprises the residue of lignin.

In one embodiment, the lignin-containing salt resin comprises (A) the reaction product of: (i) lignin, (ii) an amine, and (iii) a carbonyl compound. In this embodiment, the reaction product of components (i), (ii), and (iii) is synthesized via a mannich reaction, which is known in the art. Through the use of the mannich reaction, the phenolic moieties of the lignin can be functionalized and turned into mannich bases. These bases can then be neutralized with a neutralizing compound, such as an acid, thereby rending the lignin cationic. Suitable acids that may be used as the neutralizing compound include, without limitation, acetic acid, formic acid, lactic acid, sulfamic acid, or combinations thereof.

In certain embodiments, the lignin used as component (i) could be the modified lignin described in the preceding section. Accordingly, in some embodiments, the lignin is reacted with a monofunctional compound prior to being reacted with components (ii) or (iii).

In other embodiments, lignin that has not been reacted with a monofunctional compound can be used as component (i). In these embodiments, the type of lignin as well as the amount used in the electrodepositable coating composition is selected in order to minimize and/or eliminate the likelihood of gellation during synthesis of the coating composition such as during resin synthesis.

Suitable amines that may be used as component (ii) include, without limitation, dimethyl amine, N-methylethanolamine, diethanolamine, dimethylaminopropyl amine, diketamine, aminopropyl diethanolamine, or combinations thereof.

Suitable carbonyl compounds that may be used for component (iii) include, without limitation, formaldehyde, acetaldehyde, acetone, or combinations thereof.

In certain embodiments, the reaction mixture used to form reaction product (A) does not include any additional phenolic compounds (e.g., phenol, alkyl phenol, aryl phenol, resorcinol). That is, in these embodiments the lignin is the only compound that contains a phenolic moiety.

In certain embodiments, the reaction used to form reaction product (A) is conducted at a temperature ranging from 80° C. to 120° C. for a time ranging from 60 minutes to 360 minutes, such as from 120 minutes to 180 minutes. In other embodiments, conditions typically used for mannich reactions, which are known in the art, are used to form reaction product (A).

The mannich reaction, which can be used to form reaction product (A), can be catalyzed by adding a small amount of an acid, such as hydrochloric acid, p-toluenesulfonic acid, methane sulfonic acid, sulfamic acid, sulfuric acid, phosphoric acid, acetic acid, or combinations thereof, to the reaction vessel containing components (i), (ii), and (iii).

In certain embodiments, the reaction product of (A) is further reacted with an epoxy functional material and/or phenolic material to form an intermediate product that is later neutralized with a neutralizing compound, such as those described above, thereby forming the lignin-containing cationic salt resin of the present invention. Suitable epoxy functional materials that may be used include, without limitation, EPON 828, EPON 1001, an epoxy functional resin, or combinations thereof. Suitable phenolic material that may be used include, without limitation, bisphenol A, bisphenol F, or combinations thereof.

In other embodiments, the lignin-containing cationic salt resin comprises (B) the reaction product of: (a) lignin, (b) epichlorohydrin, and (c) an amine. The (c) amine is typically added after components (a) and (b) have been reacted with one another. In these embodiments, the lignin comprises a number of phenolic moieties that react with epichlorohydrin in order to yield a lignin comprising epoxy functional groups. The epoxy functional lignin can then be rendered cationic by first reacting the lignin with an amine, such as those described above, a sulfide (e.g., thioether), or combinations thereof, and then reacting the lignin with a neutralizing compound such as those described above. Depending on the amine and/or sulfide used to react with the epoxy functional lignin, the neutralizing compound (e.g., acid) can either be added to the lignin after the lignin has been reacted with the amine and/or sulfide or it can be added to the lignin in combination with the amine and/or sulfide.

In certain embodiments, the lignin described above in connection with component (i) can also be used as the lignin for component (a). Additionally, the various amines that are described above in connection with component (ii) may also be used as the amine for component (c).

In certain embodiments, the reaction used to form reaction product (B) is conducted at a temperature ranging from 80° C. to 120° C. for a time ranging from 60 minutes to 360 minutes A catalyst can be used to catalyze the formation of reaction product (B). Suitable catalysts that may be used include, without limitation, sodium hydroxide, potassium hydroxide, sodium methoxide, or combinations thereof. In other embodiments, catalysts suitable for use with reactions of phenolic materials (e.g., bisphenol A) may be used.

In certain embodiments, the reaction product of (B) is further reacted with an epoxy functional material and/or phenolic material to form an intermediate product that is later neutralized with a neutralizing compound, such as those described above, thereby forming the lignin-containing cationic salt resin of the present invention. Suitable epoxy functional materials that may be used include, without limitation, EPON 828, EPON 1001, an epoxy functional resin, or combinations thereof. Suitable phenolic material that may be used include, without limitation, bisphenol A, bisphenol F, or combinations thereof. However, in certain embodiments, the materials used to synthesize reaction product (B) do not include aldehydes and/or ketones.

While the lignin-containing cationic salt resin has been described as comprising reaction products (A) or (B), in some embodiments, the lignin-containing cationic salt can also comprise a combination of (A) and (B).

The lignin-containing cationic salt resin, in certain embodiments, comprises 50 weight percent of the electrodepositable coating composition based on total resin solids. In certain embodiments, the lignin-containing cationic salt resin comprises 60 weight percent to 70 weight percent of the electrodepositable coating composition based on total resin solids. In other embodiments, the lignin-containing cationic salt resin comprising reaction product (B) can comprise from 60 weight percent to 90 weight percent, such as from 70 weight percent to 80 weight percent, of the electrodepositable coating composition based on total resin solids of the coating composition.

III: Lignin that has not been Reacted with a Monofunctional Compound

The present invention is also directed to an electrodepositable coating composition comprising lignin wherein the lignin has not been reacted with a monofunctional compound. Unlike the modified lignin described above, in this particular embodiment, the reactivity of the lignin toward other components used in the coating composition is not modified (e.g., reduced) since it is not reacted with the monofunctional compounds disclosed herein. Accordingly, the lignin is more reactive toward epoxy functional compounds than the modified lignin. While the lignin described in this paragraph is not reacted with another compound, such as the monofunctional compound, this is not meant to exclude the possibility of the lignin being subjected to other reactions during the processing of the lignin. That is, prior to incorporation of the lignin into the electrodepositable coating composition, the supplier of the lignin might have subjected the lignin to other chemical reactions such as a pretreating reaction.

In order to reduce the possibility of gellation of the electrodepositable coating composition, in these embodiments, the lignin comprises 5 weight percent, such as from 3 weight percent to 5 weight percent, of the coating composition based on the total resin solids of the coating composition.

Other Components of the Coating Composition

In general, an electrodepositable coating composition is made by dispersing a first and second component in an aqueous solution thereby forming the electrodepositable coating composition. A suitable aqueous solution into which the components may be dispersed is water, such as deionized water.

In general, the first component, which can be described as the main vehicle ("clear resin feed") comprises a film-forming resin or polymer and a curing agent (also referred to as a "crosslinking agent") that is capable of reacting with the film-forming resin. The first component may also comprise any additional water-dispersible, non-pigmented components (e.g., catalysts, hindered amine light stabilizers). A wide variety of film-forming resin can be used so long as the film-forming resin are "water dispersible." As used herein, "water dispersible" means that a material is adapted to be solubilized, dispersed, and/or emulsified in water. Examples of film-forming resins suitable for use in the present invention, without limitation, resins or polymers derived from a polyepoxide, an acrylic, a polyurethane, a polyester, or combinations thereof. In certain embodiments, the film-forming resin can comprise functional groups. As used herein, "functional groups" or "reactive functional groups" means hydroxyl, carboxyl, carbamate, epoxy, isocyanate, aceto acetate, amine-salt, mercaptan, or combinations thereof. The film-forming resin described above are also ionic in nature. Specifically, the film-forming resins are cationic. In other words, the film-forming resin comprises cationic salt groups, generally prepared by neutralizing a functional group on the film-forming polymer with an acid, which enables the film-forming polymer to be electrodeposited onto a cathode. For example, in some embodiments, a film-forming cationic resin or polymer can be derived by first reacting a polyepoxide containing polymer with an amine, such as those described above, 1,5,7-triazabicyclo[5.5.0]dec-5-ene (TBD), sulfides, or combinations thereof, then reacting the polymer with an acid. Depending on compound that is used to react with the epoxy functional resin, the acid can either be added to the resin after the resin has been reacted with the amine, TBD, and/or sulfide or it can be added to the resin in combination with these compounds.

In some embodiments, the film-forming resin described above can be the lignin-containing cationic salt resin disclosed herein or it can be a combination of the lignin-containing cationic salt resin with another film-forming resin. For example, the lignin-containing cationic salt resin can be used in conjunction with an epoxy functional resin known in the art.

Alternatively, in other embodiments, the lignin-containing cationic salt resin described in section II above can comprise all or a portion of the film-forming resin described in the preceding paragraphs. Accordingly, in some embodiments, the lignin-containing salt resin described in section II (specifically, the one derived from reaction product (B)) can be used in lieu of the epoxy functional resin that is typically used as the film forming polymer of electrodepositable coating compositions known in the art.

In certain embodiments, the lignin described in sections I, II, and/or III above are added to the first component. Specifically, in these embodiments, the lignin is added to the reaction vessel in which the film-forming resin is being prepared. When the lignin is added will depend on a variety of factors such as whether a lignin as described in section I or III are being used in the electrodepositable coating composition since epoxy functional monomers are typically used to form the film-forming resin. Accordingly, depending on the reactivity of the lignin to epoxy functional groups, the lignin may either be added at the beginning or near the end of the synthesis of the film-forming resin.

As stated above, the first component also comprises a curing agent that is reactive towards that film-forming resin described in the preceding paragraph. For example, the film-forming agent may comprise moieties that are reactive with the functional groups of the film-forming polymer. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % based on the total resin solids of the coating composition.

In certain embodiments, the first component may further comprise a curing catalyst which may be used to catalyze the reaction between the crosslinking agent and the film-forming polymer. In certain embodiments, the cyclic guanidine of the present invention may act as a curing catalyst. In some embodiments, the cyclic guanidine is the only curing catalyst in the coating composition while in other embodiments the cyclic guanidine is one of a plurality of curing catalyst in the coating composition. Suitable curing catalysts that may be used in the present invention include, without limitation, organotin compounds (e.g., dibutyltin oxide, dioctyltin oxide) and salts thereof (e.g., dibutyltin diacetate); other metal oxides (e.g., oxides of cerium, zirconium and/or bismuth); and salts thereof (e.g., bismuth sulfamate and/or bismuth lactate), or combinations thereof.

In general, the second component, which can be described as the grind vehicle ("pigment paste"), comprises pigment (e.g., titanium dioxide, carbon black), a water-dispersible grind resin, which can be the same or different from the film-forming polymer, and, optionally, additives such as catalysts, antioxidants, biocides, defoamers, surfactants, wetting agents, dispersing aids, clays, hindered amine light stabilizers, UV light absorbers and stabilizers, a stabilizing agent, or combinations thereof. All of these materials are known to those skilled in the art.

Coating System

The electrodepositable coating composition described herein may be applied alone or as part of a coating system that can be deposited onto a number of different substrates. The coating system typically comprises a number of coating layers. A coating layer is typically formed when a coating composition that is deposited onto the substrate is substantially cured by methods known in the art (e.g., by thermal heating).

Suitable substrates that can be coated with the electrodepositable coating composition of the present invention include, without limitation, metal substrates, metal alloy substrates, and/or substrates that have been metallized, such as nickel plated plastic. In some embodiments, the metal or metal alloy can be aluminum and/or steel. For example, the steel substrate could be cold rolled steel, electrogalvanized steel, and hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989. Alternatively, in other embodiments, the substrate is not pretreated with a pretreatment solution prior to coating the substrate with the coating composition described herein.

In certain embodiments, the electrodepositable coating composition of the present invention is applied over a bare (i.e., non-pretreated) substrate. However, in some embodiments, the electrodepositable coating composition of the present invention can be applied to a substrate that has been pretreated. After the electrodepositable coating composition is cured, a primer-surfacer coating composition is applied onto at least a portion of the electrodepositable coating composition. The primer-surfacer coating composition is typically applied to the electrodepositable coating layer and cured prior to a subsequent coating composition being applied over the primer-surfacer coating composition.

The primer-surfacer layer that results from the primer-surfacer coating composition serves to enhance chip resistance of the coating system as well as aid in the appearance of subsequently applied layers (e.g., color imparting coating composition and/or substantially clear coating composition). As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482, which is incorporated in its entirety herein by reference.

It should be noted that in some embodiments, the primer-surfacer coating composition is not used in the coating system. Therefore, a color imparting basecoat coating composition can be applied directly onto the cured electrodepositable coating composition.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989,642, 6,245,855, 6,387,519, and 7,005,472, which are incorporated in their entirety herein by reference, can be used in the coating system. In certain embodiments, the substantially clear coating composition can also comprise a particle, such as a silica particle, that is dispersed in the clearcoat coating composition (such as at the surface of the clearcoat coating composition after curing).

One or more of the coating compositions described herein can comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005-0287348, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, the coating composition can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The coating compositions that form the various coating layers described herein can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating compositions may be cured using any technique known in the art such as, without limitation, thermal energy, infrared, ionizing or actinic radiation, or by any combination thereof. In certain embodiments, the curing operation can be carried out at temperatures $\geq 10°$ C. In other embodiments, the curing operation can be carried out at temperature $\leq 246°$ C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In certain embodiments, one or more of the coating compositions described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of $-10°$ C. to 120° C., such as 5° C. to 80° C., in some cases 10° C. to 60° C. and, in yet other cases, 15° C. to 40° C.

The dry film thickness of the coating layers described herein can range from 0.1 micron to 500 microns. In other embodiments, the dry film thickness can be $\leq 125$ microns, such as $\leq 80$ microns. For example, the dry film thickness can range from 15 microns to 60 microns.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1

| Lignin Mannich Reaction Product | | |
|---|---|---|
| # | Material | Parts by weight |
| 1 | Black Kraft Lignin[1] | 270.0 |
| 2 | Morpholine | 405.6 |
| 3 | 35% Aq. Formaldehyde | 11.4 |

[1]Obtained from Baikalsk Pulp and Paper Mill, 25% Solids.

Materials 1, 2 and 3 were added to a round bottom flask equipped with a mechanical stirrer, condenser, receiver, temperature probe and inert gas sparge. The mixture was then heated to 85° C. and stirred for 4 hours. The reaction mixture was then cooled to 25° C. and its pH adjusted to 3.6 with 4N hydrochloric acid to precipitate the reaction product. The product was filtered, washed with water, ethanol and diethyl ether and dried under vacuum to give 20.1 parts of brown powder.

Example 2

| Carbamate crosslinker | | |
|---|---|---|
| # | Material | Parts by weight |
| 1 | Bishexamethylene triamine[1] | 1342.60 |
| 2 | Propylene Carbonate | 1274.84 |
| 3 | methylisobutyl ketone | 1121.76 |
| | TOTAL | 3971.95 |

[1]DYTEK BHMT-HP obtained from INVISTA.

1 was charged into a reaction vessel under a nitrogen atmosphere, stirred and heated to 40° C. Charge 2 was added dropwise at such a rate as to keep the temperature below 70° C. The mixture was then held at 70° C. until the reaction was complete as indicated by a constant meq amine. Charge 3 was then added and the material filled out.

Example 3

| Cationic Additive | | |
|---|---|---|
| # | Material | Parts by weight |
| 1 | EPON 828[1] | 458.31 |
| 2 | Bisphenol A | 167.25 |
| 3 | Methylisobutyl ketone (mibk) | 70.00 |
| 4 | Ethyltriphenyl phosphonium iodide | 0.60 |
| 5 | Carbamate Crosslinker from example 2 | 399.24 |
| 6 | Diethanolamine | 7.86 |
| 7 | Ketimine[2] | 40.54 |
| 8 | Butyl Carbitol Formal[3] | 122.44 |
| 9 | Methylisobutyl ketone (mibk) | 38.34 |

[1]Epoxy resin available from Hexion Specialty Chemicals.
[2]MIBK diketimine of diethylene triamine at 72.7% in MIBK.
[3]Available as MAZON 1651 from BASF Corporation.

Materials 1, 2, and 3 were charged to a 4 neck round bottom flask, fit with a stirrer, temperature measuring probe, $N_2$ blanket and heated to 110° C. When the mixture was homogenious, material 4 was added and the mixture heated to 125° C. at which point it began to exotherm. The reaction mixture was allowed to exotherm to 160 to 180° C., held there for an hour and then allowed to cool to 115° C. Material 5 was added and the mixture reheated to 115° C. and held there for 30 minutes whereupon materials 6 and 7 were added and the mixture held for an additional 2 hours at 115° C. The reaction mixture was then diluted with materials 8 and 9 to the cationic additive.

Example 4

| Cationic Lignin Dispersion | | |
|---|---|---|
| # | Material | Parts by Weight |
| 1 | Cationic Additive from example 2 | 302.60 |
| 2 | Butyl CELLOSOLVE | 48.00 |
| 3 | Isopropanol | 42.00 |
| 4 | Lignin Mannich Adduct from Example 1 | 75.00 |
| 5 | Deionized Water | 135.00 |
| 6 | Glacial Acetic Acid | 17.25 |
| 7 | Methylisobutyl ketone (mibk) | 30.00 |
| 8 | Deionized Water | 2013.2 |

Materials 1, 2, 3, and 4 were charged to a round bottom flask and stirred and heated to 83° C. Once the temperature reached 83° C., materials 5, 6 and 7 were added and the stirring and heating continued for 1 hour and 40 minutes. The stirring was continued and the mixture then cut with material 8 to give an electrodepositable cationic dispersion with a pH of 4.34 and a conductivity of 1376 umhos.

What is claimed is:

1. A cationic electrodepositable coating comprising a lignin-containing cationic salt resin that comprises (A) the reaction product of lignin, an amine and a carbonyl compound wherein the lignin and carbonyl are reacted directly with each other; alone or in combination with (B) the reaction product of lignin, epichlorohydrin and an amine; wherein the carbonyl compound of reaction product (A) comprises formaldehyde and the amine comprises dimethylaminopropyl amine.

2. The cationic electrodepositable coating composition of claim 1, wherein the lignin is reacted with a monofunctional compound prior to being reacted with the amine or carbonyl compound of reaction product (A).

3. The cationic electrodepositable coating composition of claim 2, wherein the monofunctional compound comprises epoxide, cyclic carbonate, or combinations thereof.

4. The cationic electrodepositable coating composition of claim 3, wherein the monofunctional epoxide comprises ethylene oxide, propylene oxide, or combinations thereof.

5. The cationic electrodepositable coating composition of claim 3, wherein the monofunctional cyclic carbonate compound comprises ethylene carbonate.

6. The cationic electrodepositable coating composition of claim 1, wherein the lignin-containing cationic salt resin comprises ≧50 weight percent of the coating composition based on the total resin solids of the coating composition.

7. A method of making the cationic electrodepositable coating composition of claim 1 wherein the reaction product comprises lignin, an amine and carboxyl compound comprising: (i) reacting lignin, a carbonyl compound, and an amine wherein the reaction product is synthesized via a Mannich reaction.

8. A cationic electrodepositable coating comprising a lignin-containing cationic salt resin that comprises (A) the reaction product of lignin, epichlorohydrin and an amine; alone or in combination with (B) the reaction product of lignin, an amine and a carboxyl compound; wherein the amine in reaction product (A) comprises methylethanol amine.

9. The cationic electrodepositable coating composition of claim 8, wherein the lignin is reacted with a monofunctional compound prior to being reacted with epichlorohydrin or the amine of reaction product A.

10. The cationic electrodepositable coating composition of claim 9, wherein the monofunctional compound comprises epoxide, cyclic carbonate, or combinations thereof.

11. The cationic electrodepositable coating composition of claim 10, wherein the monofunctional epoxide comprises ethylene oxide, propylene oxide, or combinations thereof.

12. The cationic electrodepositable coating composition of claim 10, wherein the monofunctional cyclic carbonate compound comprises ethylene carbonate.

13. The cationic electrodepositable coating composition of claim 8, wherein the lignin-containing cationic salt resin comprises ≧50 weight percent of the coating composition based on the total resin solids of the coating composition.

14. A method of making the cationic electrodepositable coating composition of claim 8 wherein the reaction product comprises lignin, epichlorohydrin and an amine comprising: (i) reacting lignin and epichlorohydrin to form an intermediate reaction product, and then reacting the intermediate reaction product with an amine; and (ii) reacting the reaction product of (i) with an amine and an acid.

15. A cationic electrodepositable coating composition comprising a lignin-containing cationic salt resin that comprises the product of a Mannich reaction between lignin, an amine and a carbonyl compound, which reaction product is further reacted with an epoxy functional resin.

16. A cationic electrodepositable coating composition comprising a lignin-containing cationic salt resin that comprises the reaction product of lignin, epichlorohydrin and an amine, which reaction product is further reacted with an epoxy functional resin.

* * * * *